Patented June 13, 1944

2,351,477

UNITED STATES PATENT OFFICE 2,351,477

SOLDER ALLOY

George M. Bouton, Madison, George S. Phipps, Chatham, and Earle E. Schumacher, Maplewood, N. J., assignors to Bell Telephone Laboratories, Incorporated, New York, N. Y., a corporation of New York No Drawing. Application April 29, 1942, Serial No. 440,978

8 Claims. (Cl. 75—166)

This invention relates to new alloys and more particularly to new solders especially useful for wiping joints in lead piping or cable sheathing.

Wiping solders are commonly made up of lead and tin, together with very small amounts of other materials present as impurities or intentionally added to modify the properties of the solder. For the wiping of joints in cable sheath such solders usually contain in the vicinity of 40 per cent tin.

According to the present invention a considerable economy in tin is achieved by the provision of a solder in which it is possible to replace a large part of the tin by bismuth and yet retain the characteristics which are desirable in a wiping solder. This is accomplished by the use of an alloy made up primarily of lead, tin and bismuth but containing small amounts of antimony and arsenic.

In this alloy the amounts of tin and bismuth combined are comparable to the amounts of tin employed alone in previously known lead-tin wiping solders. The relative proportions of tin and bismuth employed may vary over a considerable range. For tin economy it is desirable to replace as much tin as possible with bismuth. However, it appears to be necessary to retain a substantial amount of tin in the alloy in order to produce a wiping solder of satisfactory characteristics. In general, the most suitable wiping solders from the standpoint of operation and tin economy are produced when roughly two-thirds of the tin in a lead-tin wiping solder is replaced by bismuth.

Alloys made up solely of lead, tin and bismuth form relatively coarse grained wiping solders which do not handle as smoothly as is desired in the plastic state during the wiping operation. The addition of small amounts of antimony and arsenic produce solders which have considerably improved handling qualities and are at least comparable to the best lead-tin solders. This result is apparently due, to a substantial extent, to the grain refining action of these ingredients.

To produce an appreciable effect upon the solder the arsenic should be present in an amount exceeding about .02 per cent or preferably exceeding about .05 per cent. A desirable range for arsenic content lies between about .05 per cent and about .15 per cent or preferably between about .08 per cent and about .15 per cent. The amount of arsenic found most suitable is about .1 per cent. However arsenic may be used in amounts up to about .2 per cent or even higher.

It is desirable that the antimony be present in an amount of at least .1 per cent and preferably in excess of .3 per cent. The amount of antimony found most desirable is about .5 per cent. However, in some instances it may be desirable to use larger amounts of antimony up to about 5 per cent; but ordinarily antimony will be present in amounts not greater than about 1 per cent.

One of the most suitable wiping solders of the present invention has the following composition:

|  | Per cent |
|---|---|
| Lead | 63.4 |
| Bismuth | 23.0 |
| Tin | 13.0 |
| Arsenic | 0.1 |
| Antimony | 0.5 |

Solders having very satisfactory characteristics may be produced within about the following range:

|  | Per cent |
|---|---|
| Lead | 61–67 |
| Bismuth | 20–26 |
| Tin | 10–16 |
| Arsenic | .05–.15 |
| Antimony | .1–1 |

Where higher melting points are not objectionable or where economy of bismuth and tin is not so important, a wider range of lead content may be employed between the limits of about 58 per cent and about 72 per cent by weight of the alloy. However, in most cases it will be desirable to restrict the content of lead to between about 60 per cent and about 68 per cent.

Although a relatively high bismuth content is necessary where economy of tin is desired, small amounts of bismuth in excess, however, of about 1 per cent by weight of the alloy may be employed with satisfactory results from the standpoint of satisfactory operation. Ordinarily larger amounts of bismuth in excess of about 4 per cent or preferably in excess of about 10 per cent will be employed. No greater amount of bismuth should be used, however, than would reduce the percentage of tin present to about 4 per cent of the alloy. In general, solders having a tin content in excess of about 10 per cent of the alloy will be found more suitable.

These proportions when plotted on a triaxial diagram, the coordinates of which are lead, tin and bismuth, will enclose areas having the following limits:

|  | Area I | Area II | Area III | Area IV | Area V |
|---|---|---|---|---|---|
|  | Percent | Percent | Percent | Percent | Percent |
| Lead | 58–72 | 58–72 | 58–72 | 60–68 | 60–68 |
| Bismuth | 1–38 | 4–32 | 10–32 | 4–30 | 10–30 |
| Tin | 4–41 | 10–38 | 10–32 | 10–30 | 10–30 |

In the solders falling within these limits, arsenic and antimony are present in addition within the limits set forth above.

The wiping solders of the present invention may be prepared from pure metals, but most satisfactory results will ordinarily be obtained by the use of solder grades of lead and tin containing the incidental impurities common to this type of lead or tin. The superior results when solder grades are used are believed due to the fact that the small amounts of various impurities form discontinuous points or seeds in the cooling molten solder thus contributing to the formation of a larger number of finer crystals. The fineness of the lead-rich crystals which are precipitated from molten wiping solders during cooling is believed an important factor in ease of handling and in the formation of sound joints. Typical solder grades of lead are chemical lead, copper lead, corroding lead or the secondary leads. Some of the common impurities found in these leads are one or more of copper, silver, nickel, iron, aluminum and zinc. Solder grades of tin usually contain similar impurities.

Although the invention has been described in terms of its specific embodiments, certain modifications and equivalents will be apparent to those skilled in the art and are intended to be included within the scope of the present invention, which is to be limited only by the fair and reasonable scope of the appended claims.

What is claimed is:

1. A wiping solder having substantially the following composition:

| | Per cent |
|---|---|
| Lead | 63.4 |
| Bismuth | 23.0 |
| Tin | 13.0 |
| Arsenic | 0.1 |
| Antimony | 0.5 | together with incidental impurities.

2. A lead cable sheath joint wiped with the solder described in claim 1.

3. A wiping solder having substantially the following composition:

| | Per cent |
|---|---|
| Lead | 61–67 |
| Bismuth | 20–26 |
| Tin | 10–16 |
| Arsenic | .05–.15 |
| Antimony | .1–1 | together with incidental impurities.

4. A wiping solder consisting of lead, bismuth, tin, antimony and arsenic, together with incidental impurities, the lead being present in an amount between about 58 per cent and about 72 per cent by weight of the alloy; the bismuth being present in an amount in excess of about 10 per cent by weight of the alloy; the tin being present in an amount in excess of about 4 per cent by weight of the alloy; the arsenic being present in an amount greater than about .05 per cent but less than about .15 per cent by weight of the alloy; the antimony being present in an amount in excess of about .1 per cent but not greater than about 1 per cent by weight of the alloy.

5. A lead cable sheath joint wiped with the solder described in claim 3.

6. A lead cable sheath joint wiped with the solder described in claim 4.

7. The wiping solder described in claim 4, wherein the tin is present in an amount greater than about 10 per cent.

8. A wiping solder consisting of lead, bismuth, tin, antimony and arsenic, together with incidental impurities, the lead being present in an amount between about 58 per cent and about 72 per cent by weight of the alloy; the bismuth being present in an amount in excess of about 10 per cent by weight of the alloy; the tin being present in an amount in excess of about 4 per cent by weight of the alloy; the arsenic being present in an amount greater than about .02 per cent but less than about .2 per cent by weight of the alloy; the antimony being present in an amount in excess of about .1 per cent but not greater than about 5 per cent by weight of the alloy.

GEORGE M. BOUTON.
GEORGE S. PHIPPS.
EARLE E. SCHUMACHER.